(12) United States Patent
Ratnakar et al.

(10) Patent No.: US 7,046,818 B2
(45) Date of Patent: May 16, 2006

(54) STANDARDS COMPLIANT WATERMARKING FOR ACCESS MANAGEMENT

(75) Inventors: Viresh Ratnakar, Sunnyvale, CA (US); Onur G. Guleryuz, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 815 days.

(21) Appl. No.: 10/010,196

(22) Filed: Nov. 30, 2001

(65) Prior Publication Data

US 2003/0033529 A1 Feb. 13, 2003

Related U.S. Application Data

(60) Provisional application No. 60/307,046, filed on Jul. 20, 2001.

(51) Int. Cl.
*G06K 9/00* (2006.01)

(52) U.S. Cl. .......................... 382/100; 380/213

(58) Field of Classification Search ............... 382/100, 382/232; 380/51, 54, 201, 210, 252, 287, 380/213, 268, 275; 713/176, 179; 705/57; 725/9, 20, 31; 370/522–529; 283/72, 901, 283/902; 375/130; 358/3.28
See application file for complete search history.

(56) References Cited

U.S. PATENT DOCUMENTS

| | | | |
|---|---|---|---|
| 6,037,984 A | 3/2000 | Isnardi et al. | |
| 6,154,541 A * | 11/2000 | Zhang | 380/28 |
| 6,208,745 B1 | 3/2001 | Florencio et al. | |
| 6,222,932 B1 * | 4/2001 | Rao et al. | 382/100 |
| 6,229,924 B1 | 5/2001 | Rhoads et al. | |
| 6,240,121 B1 | 5/2001 | Senoh | |
| 6,246,802 B1 | 6/2001 | Fujihara et al. | |
| 6,285,775 B1 * | 9/2001 | Wu et al. | 382/100 |
| 6,343,138 B1 * | 1/2002 | Rhoads | 382/100 |
| 6,411,725 B1 * | 6/2002 | Rhoads | 382/100 |
| 6,539,475 B1 * | 3/2003 | Cox et al. | 713/100 |
| 6,611,607 B1 * | 8/2003 | Davis et al. | 382/100 |
| 6,668,246 B1 * | 12/2003 | Yeung et al. | 705/57 |
| 6,671,376 B1 * | 12/2003 | Koto et al. | 380/210 |

FOREIGN PATENT DOCUMENTS

| | | |
|---|---|---|
| EP | 1 039 414 | 9/2000 |
| EP | 1 069 757 | 1/2001 |
| WO | WO 01/16869 | 3/2001 |
| WO | WO 01/45316 | 6/2001 |

OTHER PUBLICATIONS

H. Fujii, et al., "Partial-Scrambling of Information", NTT Review, Telecommunications Assoc., Tokyo, JP. vol. 11, No. 1, Jan. 1999, pp. 116-123.

(Continued)

*Primary Examiner*—Kanjibhai Patel
*Assistant Examiner*—Abolfazl Tabatabai
(74) *Attorney, Agent, or Firm*—Michael T. Gabrik (57) ABSTRACT

Visible watermarking techniques for digital images and video operate on decoded transform coefficients and maintain the watermarked data in the same compressed format as the original so that the watermarked data can be viewed with standard tools and applications. Moreover, for most of the techniques presented, the watermarked data has exactly the same compressed size as the original. The watermark can be inserted and removed using a key for applications requiring content protection. The watermark insertion and removal algorithms are very efficient and exploit some features of compressed data formats (such as JPEG and MPEG) which allow most of the work to be done in the compressed domain.

31 Claims, 5 Drawing Sheets

OTHER PUBLICATIONS

W. Zeng, et al., "Efficient Frequency Domain Video Scrambling for Content Access Control", ACM Multimedia, Proceedings of the International Conference, New York, NY, Oct. 30, 1999, pp. 285-294.

J. Dittmann, et al., Enabling Technology for the Trading of MPEG-encoded Video, Berlin, Germany, Jul. 7, 1997, pp. 314-324.

Shi Changgui, et al., "An Efficient MPEG Video Encryption Algorithm", Seventeenth IEEE Symposium, Oct. 20, 1998, pp. 381-386.

L. Qiao, et al., "Comparison of MPEG Encryption Algorithms", Computers and Graphics, Pergamon Press Ltd., Oxford, GB, vol. 22, No. 4, pp. 437-448, Aug. 1, 1998.

Chen, Pei-Min, "A Visible Watermarking Mechanism Using a Statistic Approach," IEEE, 2000, pp. 910-913.

Mohanty, Saraju P., et al., "A DCT Domain Visible Watermarking Technique For Images," IEEE, 2000, pp. 1029-1032.

Meng, Jianhao, et al., "Embedding Visible Video Watermarks In The Compressed Domain," IEEE, 1998, pp. 474-477.

* cited by examiner (a) Original (b) Desired obstructive visible watermark (c) Traditional "blended" visible watermark (d) Corner logo as visible watermark

STANDARDS COMPLIANT WATERMARKING FOR ACCESS MANAGEMENT

CONTINUING APPLICATION DATA

This application claims the benefit of U.S. Provisional Application No. 60/307,046 filed Jul. 20, 2001 under 35 U.S.C. §119(e).

BACKGROUND OF THE INVENTION

1. Field of the Invention

This invention relates to standards- or format-compliant visible watermarking techniques for digital images and video which operate on decoded transform-coefficients. The techniques can be implemented in apparatuses, methods, and programs of instructions, e.g., software.

2. Description of the Related Art

A watermark is a digital pattern embedded into the original content of a host signal, such as a digital image. A watermark can be inserted into a digital image by manipulating pixel values in the spatial domain representation or by altering certain transform coefficients in the frequency (e.g., DCT) domain representation. In the case of a block-based DCT representation, such as that used in the JPEG or MPEG compression standards, frequency coefficients in select blocks can be altered to produce a desired watermark pattern.

There are different types of watermarks which serve different purposes. One type of watermark is visibly applied to a digital image or video frame(s) to prevent or discourage unauthorized use of the image or video. The watermark may be something simple and unobtrusive, such as a small logo in a corner of the image or video frame. However, such a watermark can be easily cropped away or concealed without a drastic loss in quality. At the other extreme, the entire image may be "corrupted" in a manner that can be undone using a key. This is similar to encrypting all of the data, except that straight-forward encryption does not leave the data format-compliant.

OBJECT AND SUMMARY OF THE INVENTION

Object of the Invention

It is therefore an object of the present invention to provide watermarking techniques that address a visible watermarking problem that lies between the two above-mentioned extremes, and provides a range of solutions for still image and video.

Summary of the Invention

According to one aspect of this invention, a method for inserting a watermark in digital data is provided. The digital data into which the watermark is inserted comprises a plurality of blocks of coded transform coefficients, each block containing one of a first type of coefficient, such as a DC coefficient, and a plurality of a second type of coefficient, such as AC coefficients. The method comprises the step of applying a scrambling algorithm to each block in a predetermined pattern area of the digital data to insert the watermark in the digital data such that the resulting watermarked digital data is format compliant. The scrambling algorithm is applied by performing at least one of the following scrambling operations (i) for at least some of the blocks in the pattern area, XORing magnitude bits of each of selected ones of the second type of coefficient with a pseudo random number, (ii) for a select number of pairs of blocks in the pattern area, swapping the plurality of second type coefficients from one block in each pair with the plurality of second type coefficients from the other block in the pair, (iii) for blocks in a first sequence of blocks in the pattern area, shuffling differential values of the first type of coefficient among blocks in the first sequence, or (iv) for blocks in a second sequence of blocks in the pattern area, shuffling select bits of the first type of coefficient among blocks in the second sequence.

The inserted watermark is preferably visible and obtrusive, and the scrambling algorithm is preferably reversible.

Preferably, each of the second type of coefficient is coded by a code $(R_l, s(V_l))$ followed by $s(V_l)$ bits from the least significant positions of the 1's complement representation of $V_l$, and if the scrambling algorithm is applied by performing at least operation (i), then preferably the magnitude bits of each of selected ones of the second type of coefficient which are XORed with a pseudo random number comprises the $s(V_l)$ bits of that coefficient.

If the scrambling algorithm is applied by performing at least operation (ii), then preferably the select number of pairs of blocks to which operation (ii) is applied are constrained to lie within a predetermined number of rows of digital data.

If the scrambling algorithm is applied by performing at least operation (iii), then preferably the differential values of the first type of coefficient are shuffled among blocks in the first sequence without changing the sum of the values of the first type of coefficient in the first sequence of blocks.

If the scrambling algorithm is applied by performing at least operation (iv), then preferably the select bits of the first type of coefficient that are shuffled among blocks in the second sequence are select left-most bits.

Another aspect of the invention involves a method for inserting multiple watermarks in an image which may include video frame(s). The image comprises a plurality of blocks of coded transform coefficients, each block containing one of a first type of coefficient and a plurality of a second type of coefficient. The method comprises the steps of applying a first watermark to each block in a first predetermined pattern area of the image; and applying a second watermark to each block in a second predetermined pattern area of the image; wherein multiple watermarks are inserted such that the resulting watermarked image is format compliant, each watermark being applied by performing at least one of the scrambling operations (i), (ii), (iii) or (iv) described above.

With this method, preferably the first predetermined pattern area comprises a central area of the image and the second predetermined pattern area comprises a peripheral ring surrounding the central area.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

In another aspect, the invention involves an apparatus for inserting a watermark in digital data that comprises a plurality of blocks of coded transform coefficients, each block containing one of a first type of coefficient and a plurality of a second type of coefficient. The apparatus comprises a processing device configured to apply a scrambling algorithm to each block in a predetermined pattern area of the digital data to insert the watermark in the digital data such that the resulting watermarked digital data is format compliant. The scrambling algorithm is applied by performing at least one of the scrambling operations (i), (ii), (iii) or (iv) described above.

Preferably, the processing device is at least one of a microprocessor, an application specific integrated circuit, or a digital signal processor.

In accordance with another aspect of the invention, a method of selling images (which may include video) over a network is provided. This method comprises the steps of maintaining a plurality of images on a network site accessible by network browsing software; enabling a customer running the network browsing software to access the network site and to view a low quality version of each of the plurality of images; enabling the customer to select at least one image and to retrieve a watermarked version of each selected image; and transmitting a key to the customer in exchange for a specified payment, whereby the client can view or print a high-quality, watermark-free version of each selected image for which payment was received; wherein the watermark on each selected image was inserted in a predetermined pattern area of that image such that each resulting watermarked image is format compliant, the scrambling algorithm being applied by performing at least one of the scrambling operations (i), (ii), (iii) or (iv) described above.

Preferably, the low quality version of each image available for viewing by the customer is a thumbnail version.

In addition, the key may include a descrambler and a printer driver, and may also be session-based.

Another method of selling images (including video) over a network comprises the steps of maintaining a plurality of images on a network site accessible by network browsing software; enabling a customer running the network browsing software to access the network site and to view a low quality version of each of the plurality of images; enabling the customer to select at least one image and to retrieve a version of each selected image having a first watermark in a first predetermined pattern area, such as a central area, and a second watermark in a second predetermined pattern area, such as a peripheral ring surrounding the central area; and transmitting a first key to the customer in exchange for a first specified payment, with which the client can remove the first watermark of each selected image for which the first specified payment was received; transmitting a second key to the customer in exchange for a second specified payment, with which the client can remove the second watermark of each selected image for which the second specified payment was received; the first and second watermarks having been inserted such that the each watermarked image is format compliant and by performing at least one of the scrambling operations (i), (ii), (iii) or (iv) described above.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A. Overview

The present invention provides visible watermarking techniques which prevent or discourage unauthorized use of the watermarked digital data and, in so doing, solves various problems that arise in real and practical commercial imaging applications. An overview of the solutions provided by this invention are described below.

Figure 1:
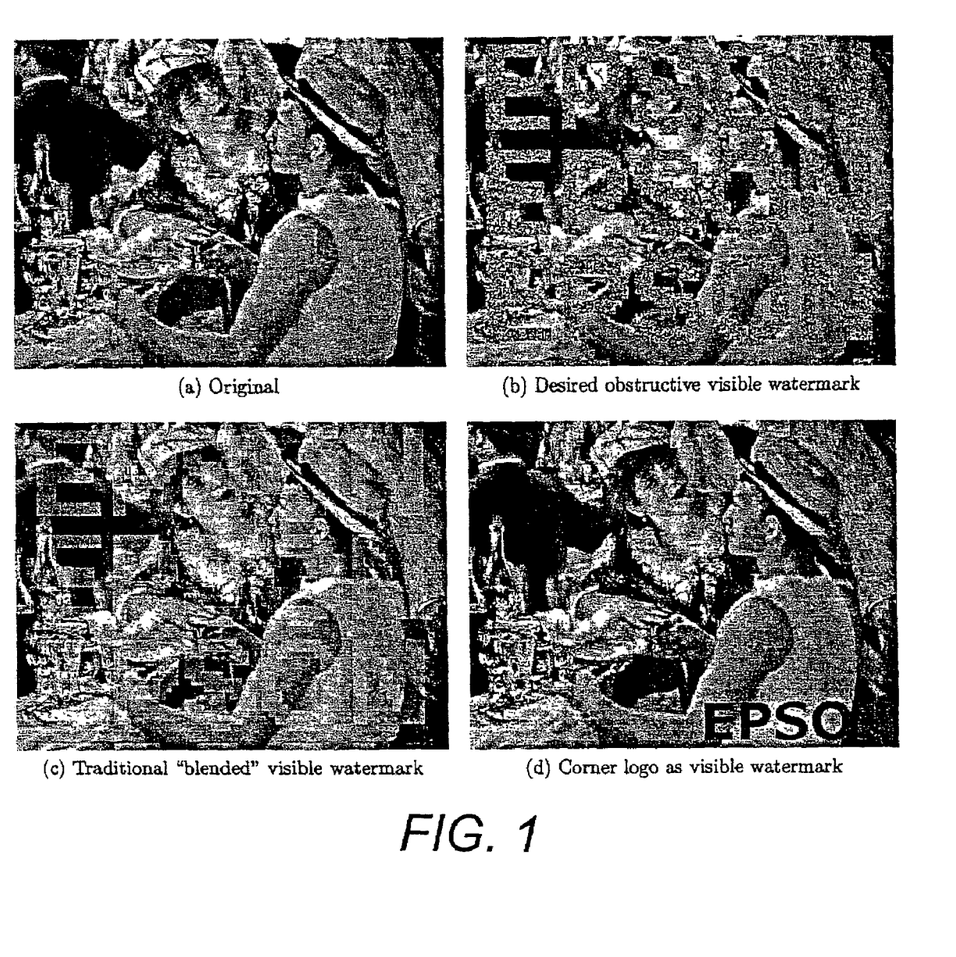
FIG. 1(a) shows an un-watermarked image.
FIG. 1(b) shows the image of FIG. 1(a) with an obstructive visible watermark applied in accordance with embodiments of the invention.
FIG. 1(c) shows the image of FIG. 1(a) with a conventional "blended" visible watermark.
FIG. 1(d) shows the image of FIG. 1(a) with corner logo visible watermark.

Consider a still image, I, as shown in FIG. 1(a). This invention provides a keyed scrambling algorithm S such that I'=S(I,K) is an image with the same dimensions as I, and is similar to I except in certain regions that form a distinctive pattern. In these regions comprising the visible watermark the scrambled image I' appears random or corrupted. The overall and intended effect is exemplified by the image in FIG. 1(b). The scrambling is secure in the sense that it is nearly impossible for an attacker, without knowing the key K, to recover the original image from I'. Moreover, the scrambling is fully reversible, given the key. That is, a complementary descrambling algorithm D exists such that D(I',K) is exactly the same as I. The effects in the case of video are essentially the same—the scrambled video is viewable, but shows a distinctive pattern corrupting parts of at least some of the video frames. For comparison, examples of two traditional visible watermarking schemes are also shown in FIGS. 1(c) and 1(d). FIG. 1(c) shows a "blended" visible watermark created by simple alpha-blending, and FIG. 1(d) shows the simplest possible visible watermark—a logo in a corner of the image.

For uncompressed raw images the desired effect shown in FIG. 1(b) can be achieved, for example, by XORing the pixel values within the pattern area with a keyed pseudo-random number sequence. While this approach is acceptable for uncompressed images, it is not particularly useful for (lossy) compressed data. Compression introduces a complication: the approach of modifying raw pixels would require that the image first be decompressed, then the modifications applied, and then the image compressed again—a lossy process. In such a scheme it would be hard to ensure that the original image can be recovered exactly upon subsequent descrambling.

This invention provides a scrambler S and descrambler D for transform-coefficient-coded host signals (e.g., Huffman-coded JPEG images) to solve this problem. In accordance with the invention, a compressed image I is scrambled to produce I'=S(I,K) which is also a valid image in the same compressed format and shows the distinctive pattern. (Note that since the description is directed to compressed images, the notation is not complicated with any additional qualifiers, such as c(I) to indicate compressed images.) A very advantageous feature of this format-compliant visible watermarking approach is that I' can be viewed by any image viewer capable of viewing I, and can also be passed through any compression-aware components of an imaging and/or network system.

In some embodiments, the scrambling algorithm provides another desirable property as well: it introduces no coding overheads. That is, the size (in bytes) of I' is exactly the same as that of I. In other embodiments, a variant scrambling algorithm is provided in which a moderate size increase is incurred to make the watermark appear more strongly.

B. JPEG Review

The "Joint Photographic Experts Group" (JPEG) compression standard is a transform-based image compression/decompression architecture that is widely used for efficient storage and transmission of images. While the techniques of this invention may employed with other known transform-based compression/decompression formats, such techniques are specifically designed with the widely accepted JPEG standard in mind. Hence, some core concepts of JPEG are reviewed below, with emphasis on those pertinent to the visible watermarking techniques of this invention.

A JPEG image consists of 8×8 blocks which have been transformed using the Discrete Cosine Transform (DCT), quantized using a table of 64 scalar quantizers, and then entropy-coded. The 8×8 blocks of the image are grouped into Minimum Coded Units (MCUs). Each MCU corresponds to an equal area of the image, with the dimensions of this area being multiples of 8. The number of 8×8 blocks from different color planes that comprise an MCU may be different, depending upon sub-sampling, the details of which can be found in any of a number of JPEG references. For the purpose of this invention, it is sufficient to summarize the structure of a JPEG image I consisting of N color planes as follows:

1. I is a sequence of coded MCUs. There are h rows of w MCUs each. The MCUs are coded in raster order.

2. Each MCU consists of $m_n$ 8×8 blocks from color component number $n(0 \leq n < N)$.

3. An MCU is coded by coding the $m_0$ blocks from color component number 0 (in raster order within the MCU), then the $m_1$ blocks from component 1, and so on.

Figure 2:
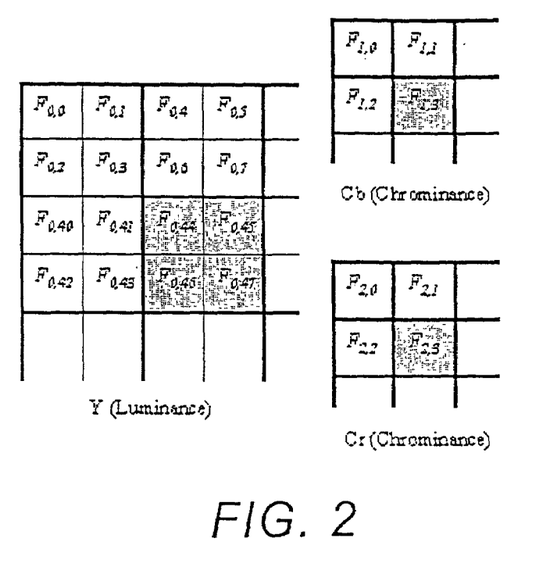
FIG. 2 is a schematic diagram of the block ordering used in embodiments of this invention, illustrated using a Y-Cb-Cr JPEG image with width 160 and chrominance sub-sampled by 2 horizontally and vertically.

It is useful to consider this JPEG image structure in a color component-wise manner. That is, look at the 8×8 blocks for each (potentially sub-sampled) color component separately, and in the relative order in which they would be found within the JPEG format. This simplifies the presentation as it is not necessary to refer to further details about MCUs. Let $F_{n,k}$ denote the 8×8 block of quantized coefficients numbered k from color component number n. Note that this notation has absorbed the fact the k is not necessarily the raster index of the block, because of sub-sampling and MCU structure. Here, $0 \leq n < N$ and $0 \leq k < whm_k$. This notation is illustrated in FIG. 2, which shows the three color planes of a typical JPEG image in Y, Cb, Cr format where the chrominance components (Cb and Cr) are sub-sampled by 2 both horizontally and vertically. The thicker lines separate MCUs while the thinner lines separate the 8×8 blocks within the Y-component of the MCU. Each Cb and Cr MCU consists of only one 8×8 block. The blocks lying on the watermark pattern are shown shaded. The image width is 160, and the MCUs are 16×16 areas of the image.

Let $F_{n,k}(z)$ denote coefficient number $z(0 \leq z \leq 63)$ in the zig-zag order used in JPEG. The first coefficient, $F_{n,k}(0)$, is the DC coefficient which is the scaled average of all the pixel values in the 8×8 block. The DC values within each color plane's blocks are differentially coded in JPEG to exploit correlation across blocks. Thus, for k>0, the value coded in the bitstream is $F_{n,k}(0)-F_{n,k-1}(0)$. Let $D_{n,k}$ denote this differential DC value, keeping in mind that $D_{n,0}=F_{n,0}(0)$.

The JPEG standard allows either Huffman coding or arithmetic coding to be used for entropy coding. While the techniques of the present invention may be employed with any known entropy coding, the following discussion focuses on Huffman-coded images since Huffman coding is the chosen alternative most of the time. In a Huffman-coded JPEG image, differential DC values $D_{n,k}$ are coded as follows. Given a value v to code, let s(v) denote the "magnitude category" of v, which is the number of bits in |v| up to the most significant 1. For example, s(0)=0, s(1)=s(−1)=1,s(3)=s(2)=s(−2)=s(−3)=2, and so on. The JPEG bitstream consists of a Huffman code for $s(D_{n,k})$, followed by $s(D_{n,k})$ least significant bits from the 1's complement representation of $D_{n,k}$. The DC Huffman coding tables may be different for different color components, or some of them may be the same.

The coding of AC coefficients $(1 \leq z \leq 63)$ also uses the magnitude category function $s(\cdot)$. Additionally, the frequently occurring situation of long runs of zeros within AC coefficient sequences is also exploited in the JPEG format. For the sequence of AC coefficients in a block $F_{n,k}$ consider the representation:

$$(R_0, V_0), (R_1, V_1), \ldots, (R_l, V_l)$$

Here, $R_0$ is the length of the run of zeros leading to the first non-zero coefficient (which has the value $V_0$). This is followed by a run of $R_1$ zeros and then another non-zero value ($V_1$), and so on. The JPEG bitstream consists of Huffman codes for pairs of $(R_i, s(V_i))$. Each such code is followed by $s(V_i)$ additional bits taken from the least significant positions in the 1's complement representation of $V_i$. The AC Huffman coding tables may also be different for different color components.

C. The Scrambling Algorithm

The goal of the scrambling process is to "corrupt" those 8×8 blocks which lie in the pattern area, while making sure that the decoded image will not be corrupted outside the pattern area and also to ensure that this corruption can be undone by the descrambler.

Let $\rho(n,k)$ be a binary function that is 1 if and only if $F_{n,k}$ (block number k from component number n) lies in the pattern area. The function $\rho$ (and hence the pattern) need not be secret, and therefore may be available to any attacker. In some embodiments, the scrambling algorithm efficiently produces a JPEG image I'=S(I,K) such that I' and I are exactly the same for MCUs where $\rho(i,j)$ is 0, and are distinctly different where $\rho(i,j)$ is 1. In other words; the blocks where $\rho$ is 1 are scrambled by S. The descrambler D reverses the scrambling completely, with the correct key.

The scrambling algorithm comprises a set of operations. In one embodiment, all of these operations are applied while in other embodiments a subset of these operations are applied. In a practical implementation, the selected operation(s) is/are applied in a single pass through the image. For clarity, each of these operations is separately described below. The scrambling and descrambling algorithms preferably use a common pseudo random number generator (PRNG) whose seed is the secret key. PRNG may also be used to generate masking values as well as random permutations and selections. To keep the notation simple, the subscript $_{PRNG}$ is used to indicate that a value, permutation, or selection has been obtained by invoking the PRNG.

C.1. AC Masks

For each block $F_{n,k}$ for which $\rho(n,k)=1$, the magnitude bits of the AC coefficients are masked by XORing with a value obtained from the PRNG. As discussed above, the AC coefficients are coded by grouping them into run-value pairs, $(R_i,V_i)$, and the coded bitstream consists of a Huffman code for $(R_i,s(V_i))$ followed by $s(V_i)$ bits from the least significant positions of the 1's complement representation of $V_i$. Referring to these $s(V_i)$ bits as B, the AC masking operation comprises replacing B with $B \oplus X_{PRNG}$, where $X_{PRNG}$ represents random values. This maintains format compliance and does not change the size of the coded image. It will be apparent to one skilled in the art that the descrambler can reverse this operation by XORing again with $X_{PRNG}$.

C.2. AC Swaps

Since the AC coefficients are coded independently from block to block, the entirety of AC coefficients can be swapped across any two blocks for which $\rho$ is 1. That is, if $\rho(n,k_1)=\rho(n,k_2)=1$, then $F_{n,k_1}(1, \ldots, 63)$ can be exchanged with $F_{n,k_2}(1, \ldots, 63)$. This would not change the bit rate at all. In fact, if the AC Huffman tables for two color components are the same (as is usually the case for the chrominance components Cb and Cr in JPEG images), then the swaps can be done across these components too.

In practice, it may be better to perform the swaps only within a small number of rows to minimize the buffering requirements of the scrambler and descrambler. Thus, in one embodiment the AC-swap operation comprises selecting (using the PRNG) a number of pairs of blocks $F_{n_1,k_1}$, $F_{n_2,k_2}$ constrained to lie within a buffered amount of MCU rows and such that both the selected blocks lie in the pattern and use the same AC Huffman table. For each such pair, all the AC coefficients are exchanged.

C.3. DC Shuffles

The previous two operations modify the AC coefficients. In practice, however, modifications to DC coefficients has far more impact upon watermark visibility than modification of AC coefficients. Accordingly, this and the next subsection describe operations that modify DC coefficients.

Consider (within color component number n) a maximal consecutive sequence of l blocks $$F_{n,k}, F_{n,k+1}, \ldots, F_{n,k+l-1}$$

each lying on the pattern. This is maximal in the sense that $\rho(n,k-1)=\rho(n,k+l)=0$ and $\rho(n,i)=1$ for $k \leq i < k+l$. The DC-shuffle operation corrupts the DC value of each block in the sequence, ensuring that the DC value for the first block after the sequence remains unchanged, and that the bits required remain the same, by shuffling the differential DC values.

Recalling that the notation $D_{n,k}$ is used to denote the differential DC value for $F_{n,k}$, the DC value for the block after the sequence is given by equation (1):

$$F_{n,k+l}(0) = F_{n,k-1}(0) + \sum_{i=k}^{k+l} D_{n,i} \quad (1)$$

Thus, as long as the sum $$\sum_{i=k}^{k+l} D_{n,i}$$

does not change, the individual $D_{n,i}$ values may be freely changed without affecting the DC values of the first block after the sequence. Moreover, if the changes are made by simply permuting the $D_{n,i}$, then the bit rate will also be exactly the same.

In one embodiment, the DC-shuffle operation generates a random permutation $\sigma_{PRNG}$ and applies it to the sequence of $D_{n,i}$ values, $k \leq i < k+l$. Note that the differential DC value of the first block after the sequence also participates in this permutation, but the net result is that its DC value (actual, not differential) is not changed.

3.4. DC Bit Shuffles

Figure 3:
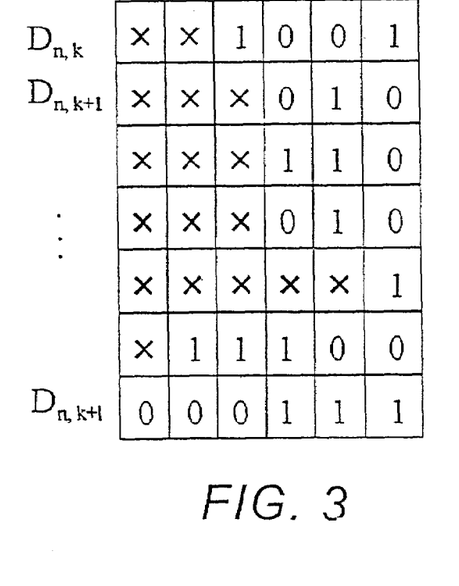
FIG. 3 is a schematic diagram showing the magnitude bits for a sequence of differential DC values.

FIG. 3 shows the sequence of DC values identified in the previous sub-section. Here, the first l blocks are the ones to be corrupted, while the block $F_{n,k+l}$ has $\rho(n,k+l)=0$ and needs to be left unmodified upon decompression. The figure shows 1 and 0 bit values starting from the rightmost column (numbered 0) up to the column number corresponding to the magnitude category of the differential DC value. Thus, in the row $D_{n,i}$ all columns numbered $s(D_{n,i})$ and greater are marked by X to indicate that these bits are not present in the bitstream.

Now, consider the bit-wise composition of the $D_{n,i}$ values in this sequence of blocks, $k \leq i < k+l$. For simplicity the subscript n is dropped. Let $s_i$ denote $s(D_{n,i})$ and let $b_i(j)$, $(0 \leq j < s_i)$ denote the $s_i$ bits of the 1's complement representation of $D_{n,i}$. Then, $$D_{n,i} = [b_i(s_i - 1) - 1][2^{s_i} - 1] + \sum_{j=0}^{s_i-1} b_i(j)2^j. \quad (2)$$

Here, the first term just makes sure that if the left-most bit (i.e., bit number $s_i-1$) is 0, then the appropriate negative number is obtained by the subtraction operation $2^{s_i}-1$. Equation (2) can be rewritten as:

$$D_{n,i} = 1 - 2^{s_i} + b_i(s_i - 1)[3 \times 2^{s_i-1} - 1] + \sum_{j=0}^{s_i-2} b_i(j)2^j. \quad (3)$$

Observe that because of the 1's complement representation, the left-most bit $b_i(s_i-1)$ of each $D_{n,i}$ has a disproportionate weight.

By substituting the value of $D_{n,i}$ from equation (3) into equation (1) it can be seen that the DC value of the first block after the sequence, i.e., $F_{n,k+l}(0)$, is a constant plus a weighted sum of all the $b_i(j)$ values, with the weight being $2^j$ for bits other than the left-most ones. The weight of each left-most bit is $3 \times 2^{j-1}-1$.

Thus, bit-plane permutation can be applied to these bits, while keeping $F_{n,k+l}(0)$ unchanged, as long as care is taken not to mix left-most bits with non-left-most bits. Let q denote the maximum value of $s_i$, for $k \leq i < k+l$. Then, for each bit-plane j, $(0 \leq j < q)$, apply two pseudo-random permutations within the $b_i(j)$ values: $\sigma_{PRNG}(j)$ and $\pi_{PRNG}(j)$. In the first permutation, $\sigma_{PRNG}(j)$, only those bits from bit-plane j participate which are the left-most bits. That is, only the $b_i(j)$ for which $s_i-1=j$ participate in $\sigma_{PRNG}(j)$. The non-left-most bits participate in the second permutation. That is, only the $b_i(j)$ for which $s_i-1>j$ participate in $\pi_{PRNG}(j)$.

It can be seen that applying these 2q permutations (two disjoint permutations $\sigma_{PRNG}(j)$ and $\pi_{PRNG}(j)$ on each bit-plane) ensures that the DC values within the pattern area are corrupted securely, while the DC value of the first following block is untouched. Moreover, the coded size remains exactly the same as it was prior to this operation.

Four operations that are applied with the scrambling algorithm of the present invention have now been described. The descrambler is straight forward in that it merely applies the inverse operations. The scrambling operations have been designed such that they are reversible. The determinations made during scrambling (such as the $s(D_{n,i})$ values) are not affected by the scrambling and hence can be repeated by the descrambler with identical results.

C.5. A Variant with Modest Size Increase

The previous four operations have been designed to ensure that the compressed size of the scrambled image I' is exactly the same as that of the original image I. Sometimes this may not be a strict requirement, and it may be acceptable to incur a modest increase in size. In such situations, the visibility of the watermark can be increased considerably by one additional operation. Here, a pseudo random number can be added to each DC value within the pattern area. Thus, if $\rho(n,k)=1$, then set $$F_{n,k}(0)=F_{n,k}(0)+X_{PRNG},$$

where $X_{PRNG}$ can be positive or negative. Note that this is a reversible operation, when care is taken to do the addition modulo the limit on the magnitude of DC differential values. Since each such actual DC value is being modified, the differential DC values will also change. Moreover, the changes are not guaranteed to maintain the compressed size. Indeed, since the "randomness" of the DC coefficient differentials is being increased, the compressed size will increase. However, by placing limits on the additive value of $X_{PRNG}$, this size increase can be kept small.

D. Flow Chart Summary of Watermarking Operations

Figure 4:
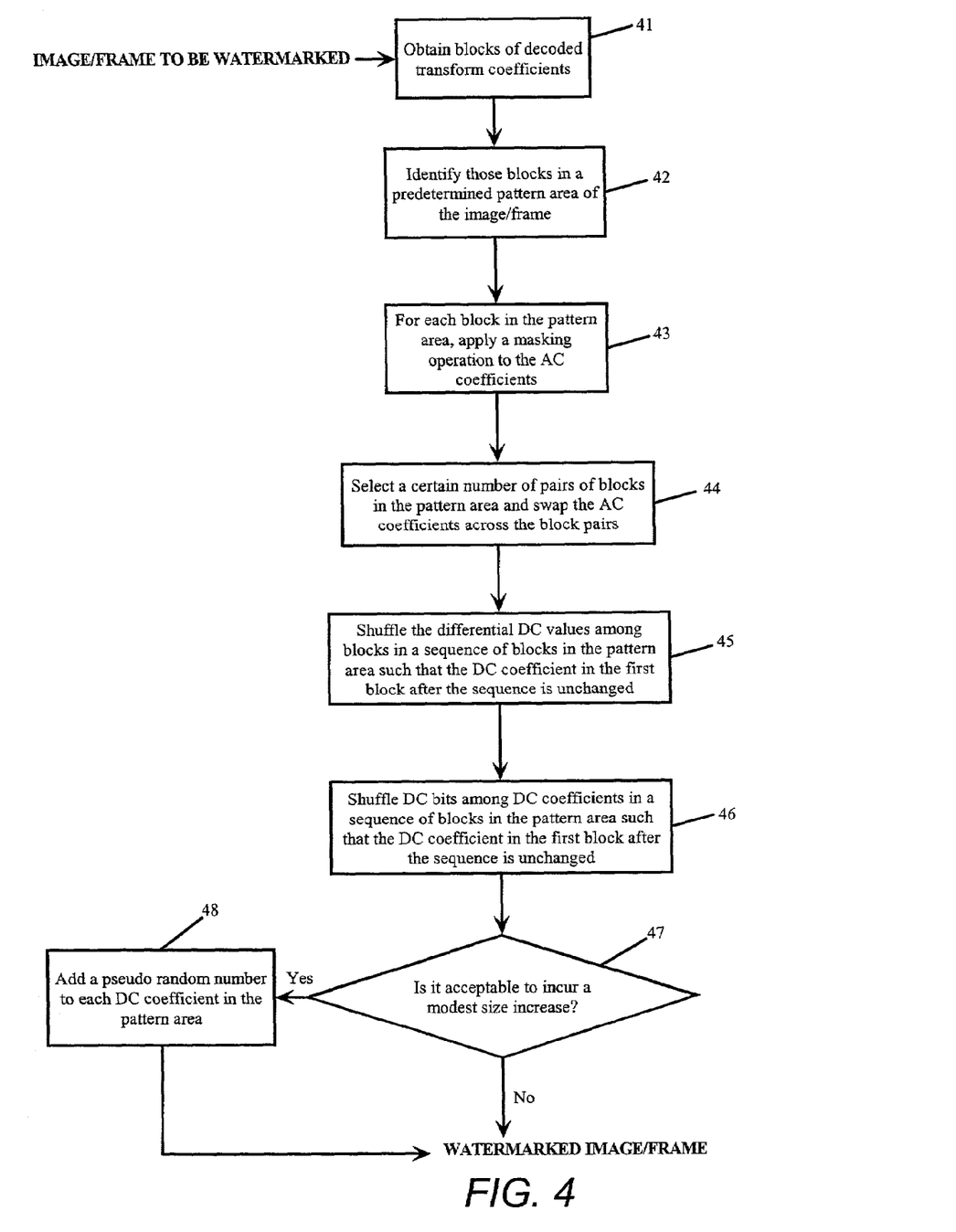
FIG. 4 is a flow chart illustrating the watermarking process in accordance with embodiments of the invention.

The flow chart of FIG. 4 summarizes and illustrates, by way of example, the watermarking process in accordance with embodiments of the invention. As illustrated in the figure, in step 41 blocks of decoded transform (e.g., DCT) coefficients of the image/frame to be watermarked are obtained. Next, in step 42, those blocks in a predetermined pattern area of the image/frame are identified. In step 43, an AC masking operation is applied to the AC coefficients of blocks in the pattern area. A second watermarking operation is performed in step 44. There, a certain number of pairs of blocks in the pattern area are selected and the AC coefficients are swapped across the block pairs. In steps 45 and 46, watermarking operations are performed on the DC coefficients in a sequence of blocks in the pattern area, without effecting the DC coefficient in the first block after the sequence. In step, 45, the differential DC values among blocks in a sequence of blocks in the pattern area are shuffled, while in step 46 DC bits are shuffled among DC coefficients in a sequence of blocks in the pattern area. None of these four operations increase the byte size of the image. If this is a strict requirement, the process proceeds through the "no" terminal of decision block 47 to generate the watermarked image/frame. If, however, a modest size increase is acceptable, the process can proceed through the "yes" terminal of block 47 to step 48 where another watermarking operation is applied. There, a pseudo random number is added to each DC coefficient in the pattern area, then the watermarked image/frame is produced.

It will be noted that the process illustrated in FIG. 4 employs all of the size-preserving watermarking operations. While this a preferred embodiment, it is not the only embodiment. In other embodiments, various subsets of these operations may be applied to achieve various degrees of effectiveness, bearing in mind that the more operations that are applied the more effective the resulting watermark.

E. Video Data

In the case of DCT-coded video data, such as in the various MPEG formats, motion prediction causes a problem. Applying the scrambling algorithm described above to MPEG video may result in corruption of blocks outside the pattern (for which $\rho$ is 0) because their motion vectors may be predicted from areas of other frames which have been corrupted. Thus, the distinctive pattern would show in the video, but there would likely be additional corruption outside the pattern. This additional corruption may be small or extensive, depending on the video sequence and block-matching algorithms used during coding.

One way to alleviate this problem is to only apply the scrambling to bi-directional coded frames (B-frames), since these frames are not used for predicting any blocks or other frames. Typically, B-frames comprise a significant fraction of all frames, and in such cases, the pattern shows up distinctively—albeit in a flashing manner. But sometimes coded video sequences do not contain any B-frames. In such cases, the only frames which can be properly corrupted (that is, without propagating the corruption to arbitrary areas on other frames) are those uni-directionally predicted frames (P-frames) which are immediately before a non-predicted frame (I-frame).

The terms "image" and "images" as used in the claims in intended to include video, in addition to still image(s).

F. Implementations

Figure 5:
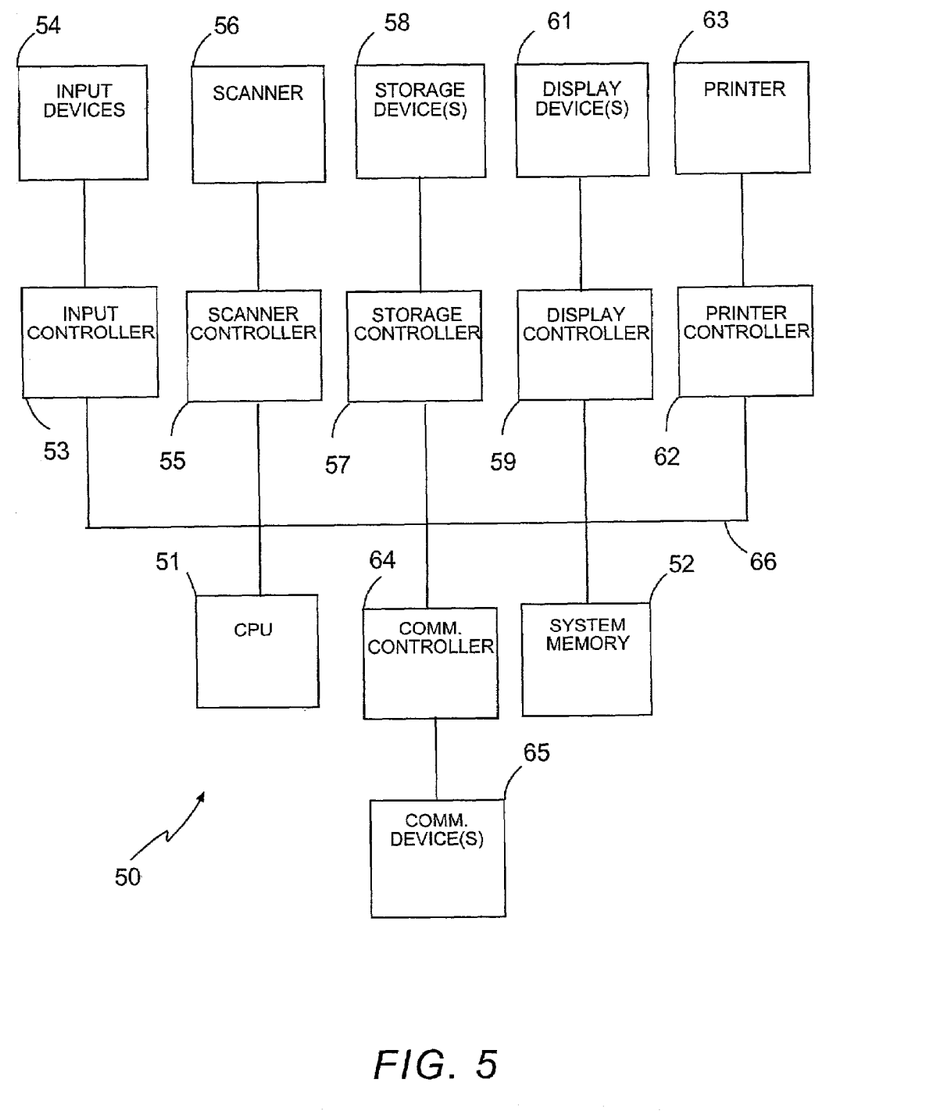
FIG. 5 is a block diagram illustrating components in an exemplary image processing system that may be used to implement aspects of the invention.

The techniques of the present invention may be conveniently implemented in software which may be run on an image processing system of the type illustrated in FIG. 5. As illustrated in FIG. 5, the system includes a central processing unit (CPU) 51 that provides computing resources and controls the computer. CPU 51 may be implemented with a microprocessor or the like, and may also include a graphics processor and/or a floating point coprocessor for mathematical computations. System 50 further includes system memory 52 which may be in the form of random-access memory (RAM) and read-only memory (ROM).

A number of controllers and peripheral devices are also provided, as shown in FIG. 5. Input controller 53 represents an interface to one or more input devices 54, such as a keyboard, mouse or stylus. There is also a controller 55 which communicates with a scanner 56 or equivalent device for digitizing documents including images to be processed in accordance with the invention. A storage controller 57 interfaces with one or more storage devices 58 each of which includes a storage medium such as magnetic tape or disk, or an optical medium that may be used to record programs of instructions for operating systems, utilities and applications which may include embodiments of programs that implement various aspects of the present invention. Storage device(s) 58 may also be used to store data to be processed in accordance with the invention. A display controller 59 provides an interface to a display device 61 which may be a cathode ray tube (CRT), thin film transistor (TFT) display or video player. A printer controller 62 is also provided for communicating with a printer 63 for printing documents including images processed in accordance with the invention. A communications controller 64 interfaces with a communication device 65 which enables system 50 to connect to remote devices through any of a variety of networks including the Internet, a local area network (LAN), a wide area network (WAN), or through any suitable electromagnetic carrier signals including infrared signals.

In the illustrated system, all major system components connect to bus 66 which may represent more than one physical bus.

Depending on the particular application of the invention, various system components may or may not be in physical proximity to one another. For example, the input data (e.g., the input image to which S or D is to be applied) and/or the output data (e.g., the output image to which S or D has been applied) may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or any other suitable electromagnetic carrier signals including infrared signals.

While the present invention may be conveniently implemented with software, a hardware implementation or combined hardware/software implementation is also possible. A hardware implementation may be realized, for example, using ASIC(s), digital signal processing circuitry, or the like. As such, the term device-readable medium further includes hardware having a program of instructions hardwired thereon. With these implementation alternatives in mind, it is to be understood that the figures and accompanying description provide the functional information one skilled in the art would require to write program code (i.e., software) or to fabricate circuits (i.e., hardware) to perform the processing required.

G. Applications

Figure 6:
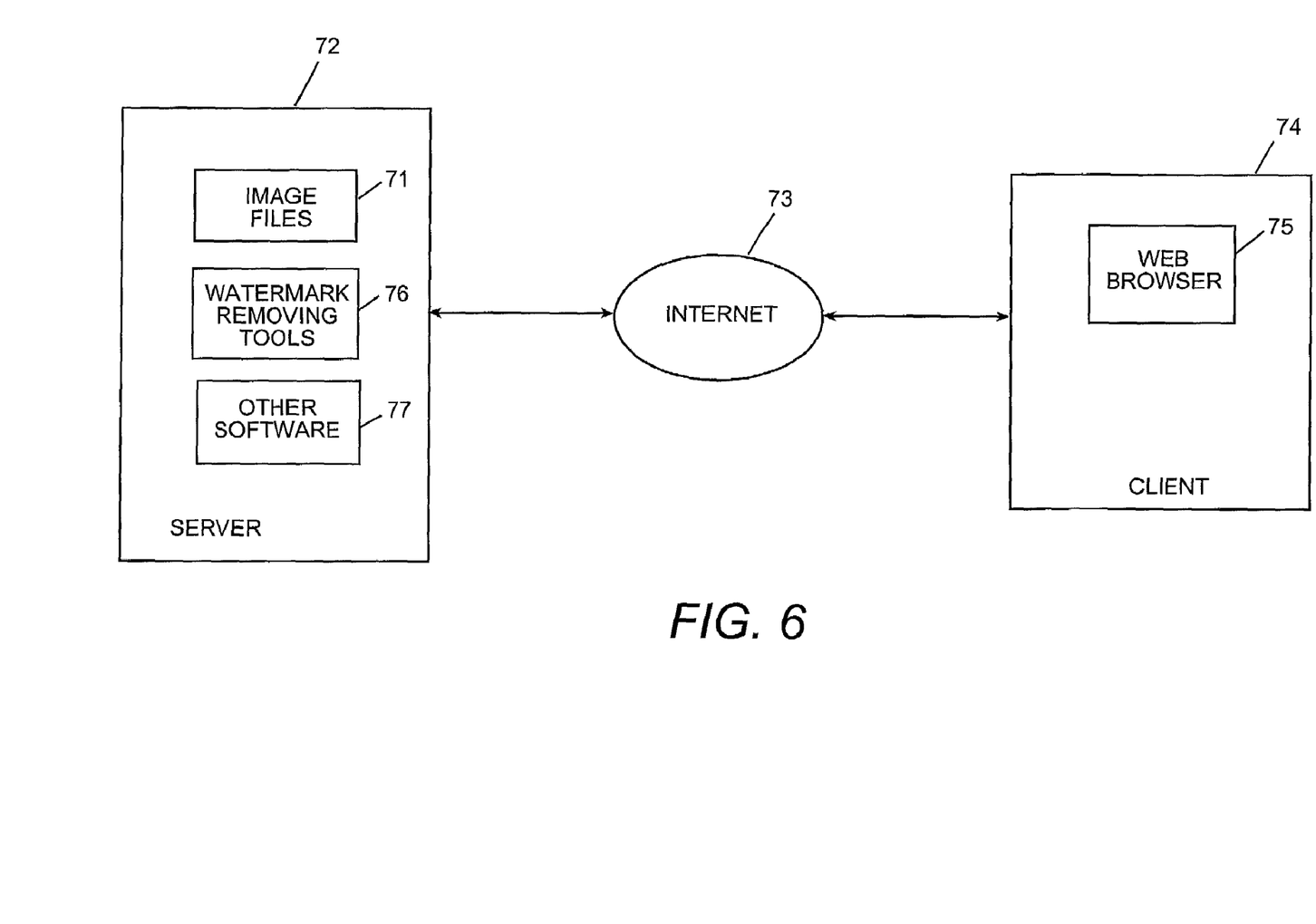
FIG. 6 is a block diagram illustrating components of a client-server computer system that may be used to implement aspects of the invention.

The visible watermarking techniques of the present invention, which are designed to prevent or discourage unauthorized use of the digital data, may be employed in a variety of real and practical commercial imaging applications. One such application is an Internet-based "image shop" which sells high-quality professional art that customers may purchase remotely and print. Such an arrangement is schematically illustrated in FIG. 6. The images offered for sale are maintained as image files 71 on a server 72 that is accessible through a network as the Internet 73. The customer, using a client computer 74, runs Internet client software, such as a web browser 75, to access the web site of the "image shop," to browse thumbnails of the artwork and to retrieve the ones in which (s)he is interested. When (s)he retrieves a high-quality image, the server 72 sends a watermarked image which (s)he can view. The retrieved image, while viewable, is a much inferior version because of the obtrusive visible watermark. With the correct key, the customer may be provided with an integrated descrambler and printer driver, which will print the image free of the watermark. While key management issues will vary depending on the requirements of the overall system, the key in the above system, for example, can be session-based, to be retrieved securely by the client software upon the customer's payment.

To facilitate the transactions, the server 72 contains appropriate watermark removing tools 76, in accordance with this invention, which may be in the form of software and may include keys, descramblers and printer drivers. The images may be watermarked either before or after they are uploaded to the server 72; if after, the server 72 would also include watermarking tools in accordance with this invention. The server 72 also contains appropriate software 77, which verifies payment and interacts with the watermark removing tools so that the appropriate tools can be transmitted to the client 74 for removal of the watermark(s). Software 77 also preferably includes software for ensuring secure transmission of images, payment and watermark removing tools.

The advantage of using the visible watermarking scheme of this invention in the above system, as opposed to simple encryption of the whole image, is that the client software can display the watermarked image. Moreover, standard technologies for retrieving content over the Internet can be used, with the knowledge that cached copies of the artwork (in the network as well as in the client's local disk cache) will only be of marginal value because of the obtrusive watermark.

For video, the sample application could be delivered over satellite or cable networks. Again, the watermarked video would be viewable to give the flavor of its content without revealing all of it. Paying customers may retrieve the key(s) needed to descramble and view the un-watermarked video.

Another application involves watermarking the same image/video multiple times with different patterns and keys. For example, a first watermarked pattern area obscures a small central area. A second watermarked pattern area obscures a larger peripheral ring. A user pays a certain amount of money to get the key to remove the watermark on the peripheral ring. The user then pays an additional amount of money to remove the watermark on the central area.

H. Effects

As the foregoing description demonstrates, the present invention provides visible watermarking techniques for digital images and video in transformed-based compressed formats. The insertion algorithm reversibly but securely scrambles parts of the digital data to obstrusively mark the image. Full access to the image is obtained by procuring the correct key to completely remove the watermark to recover an image exactly the same as the original. The watermarked data is completely format-compliant, and in most of the techniques, the same size as the original.

The scrambling and descrambling algorithms are very efficient and operate on transform (e.g., DCT) coefficients obtained by decoding the entropy (e.g., Huffman) codes. Advantageously, the algorithms do not require that the coefficients be de-zigzagged nor dequantized. In fact, the algorithms only examine the compact sequence of the non-zero coefficients within each block.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for inserting a watermark in digital data that comprises a plurality of blocks of coded transform coefficients, each block containing one of a first type of coefficient and a plurality of a second type of coefficient, the method comprising the step of:

applying a scrambling algorithm to each block in a predetermined pattern area of the digital data to insert the watermark in the digital data such that the resulting watermarked digital data is format compliant, the scrambling algorithm being applied by performing at least one of the following scrambling operations:
(i) for at least some of the blocks in the pattern area, XORing magnitude bits of each of selected ones of the second type of coefficient with a pseudo random number,
(ii) for a select number of pairs of blocks in the pattern area, swapping the plurality of second type coefficients from one block in each pair with the plurality of second type coefficients from the other block in the pair,
(iii) for blocks in a first sequence of blocks in the pattern area, shuffling differential values of the first type of coefficient among blocks in the first sequence, or
(iv) for blocks in a second sequence of blocks in the pattern area, shuffling select bits of the first type of coefficient, but not of the second type of coefficient, among blocks in the second sequence.

2. The method of claim 1, wherein the scrambling algorithm is applied by performing at least two of the scrambling operations.

3. The method of claim 1, wherein the scrambling algorithm is applied by performing at least three of the scrambling operations.

4. The method of claim 1, wherein the scrambling algorithm is applied by performing all four of the scrambling operations.

5. The method of claim 1, wherein the inserted watermark is visible and obtrusive.

6. The method of claim 1, wherein the scrambling algorithm is reversible.

7. The method of claim 1, wherein each of the second type of coefficient is coded by a code $(R_i, s(V_i))$ followed by $s(V_i)$ bits from the least significant positions of the 1's complement representation of $V_i$, wherein the scrambling algorithm is applied by performing at least operation (i), and wherein the magnitude bits of each of selected ones of the second type of coefficient which are XORed with a pseudo random number comprises the $s(V_i)$ bits of that coefficient.

8. The method of claim 1, wherein the scrambling algorithm is applied by performing at least operation (ii), and wherein the select number of pairs of blocks to which operation (ii) is applied are constrained to lie within a predetermined number of rows of digital data.

9. The method of claim 1, wherein the scrambling algorithm is applied by performing at least operation (iii), and wherein the differential values of the first type of coefficient are shuffled among blocks in the first sequence without changing the sum of the values of the first type of coefficient in the first sequence of blocks.

10. The method of claim 1, wherein the scrambling algorithm is applied by performing at least operation (iv), and wherein the select bits of the first type of coefficient that are shuffled among blocks in the second sequence are select left-most bits.

11. The method of claim 1, wherein, in operation (iv), the shuffling of select bits of the first type of coefficient, but not of the second type of coefficient, among blocks in the second sequence comprises applying two pseudo-random permutations to the select bits.

12. A method for inserting multiple watermarks in an image that comprises a plurality of blocks of coded transform coefficients, each block containing one of a first type of coefficient and a plurality of a second type of coefficient, the method comprising the steps of:
applying a first watermark to each block in a first predetermined pattern area of the image; and
applying a second watermark to each block in a second predetermined pattern area of the image;
wherein multiple watermarks are inserted such that the resulting watermarked image is format compliant, each watermark being applied by performing at least one of the following scrambling operations:
(i) for at least some of the blocks in the pattern area, XORing magnitude bits of each of selected ones of the second type of coefficient with a pseudo random number,
(ii) for a select number of pairs of blocks in the pattern area, swapping the plurality of second type coefficients from one block in each pair with the plurality of second type coefficients from the other block in the pair,
(iii) for blocks in a first sequence of blocks in the pattern area, shuffling differential values of the first type of coefficient among blocks in the first sequence, or
(iv) for blocks in a second sequence of blocks in the pattern area, shuffling select bits of the first type of coefficient, but not of the second type of coefficient, among blocks in the second sequence.

13. The method of claim 12, wherein the first predetermined pattern area comprises a central area of the image and the second predetermined pattern area comprises a peripheral ring surrounding the central area.

14. The method of claim 12, wherein, in operation (iv), the shuffling of select bits of the first type of coefficient, but not of the second type of coefficient, among blocks in the second sequence comprises applying two pseudo-random permutations to the select bits.

15. An apparatus for inserting a watermark in digital data that comprises a plurality of blocks of coded transform coefficients, each block containing one of a first type of coefficient and a plurality of a second type of coefficient, the apparatus comprising:
a processing device configured to apply a scrambling algorithm to each block in a predetermined pattern area of the digital data to insert the watermark in the digital data such that the resulting watermarked digital data is format compliant, the scrambling algorithm being applied by performing at least one of the following scrambling operations:
(i) for at least some of the blocks in the pattern area, XORing magnitude bits of each of selected ones of the second type of coefficient with a pseudo random number,
(ii) for a select number of pairs of blocks in the pattern area, swapping the plurality of second type coefficients from one block in each pair with the plurality of second type coefficients from the other block in the pair,
(iii) for blocks in a first sequence of blocks in the pattern area, shuffling differential values of the first type of coefficient among blocks in the first sequence, or
(iv) for blocks in a second sequence of blocks in the pattern area, shuffling select bits of the first type of coefficient, but not of the second type of coefficient, among blocks in the second sequence.

16. The apparatus of claim 15, wherein the processing device is configured to apply the scrambling algorithm by performing at least two of the scrambling operations.

17. The apparatus of claim 15, wherein the processing device is configured to apply the scrambling algorithm by performing at least three of the scrambling operations.

18. The apparatus of claim 15, wherein the processing device is configured to apply the scrambling algorithm by performing all four of the scrambling operations.

19. The apparatus of claim 15, wherein the processing device is at least one of a microprocessor, an application specific integrated circuit, or a digital signal processor.

20. The apparatus of claim 15, wherein, in operation (iv), the shuffling of select bits of the first type of coefficient, but not of the second type of coefficient, among blocks in the second sequence comprises applying two pseudo-random permutations to the select bits.

21. A computer-readable medium embodying a program of instructions for directing a machine to insert a watermark in digital data that comprises a plurality of blocks of coded transform coefficients, each block containing one of a first type of coefficient and a plurality of a second type of coefficient, the program of instructions comprising:

instructions for applying a scrambling algorithm to each block in a predetermined pattern area of the digital data to insert the watermark in the digital data such that the resulting watermarked digital data is format compliant, the scrambling algorithm includes instructions for performing at least one of the following scrambling operations:

(i) for at least some of the blocks in the pattern area, XORing magnitude bits of each of selected ones of the second type of coefficient with a pseudo random number, (ii) for a select number of pairs of blocks in the pattern area, swapping the plurality of second type coefficients from one block in each pair with the plurality of second type coefficients from the other block in the pair, (iii) for blocks in a first sequence of blocks in the pattern area, shuffling differential values of the first type of coefficient among blocks in the first sequence, or (iv) for blocks in a second sequence of blocks in the pattern area, shuffling select bits of the first type of coefficient, but not of the second type of coefficient, among blocks in the second sequence.

22. The computer-readable medium of claim 21, wherein the scrambling algorithm includes instructions for performing at least two of the scrambling operations.

23. The computer-readable medium of claim 21, wherein the scrambling algorithm includes instructions for performing at least three of the scrambling operations.

24. The computer-readable medium of claim 21, wherein the scrambling algorithm includes instructions for performing all four of the scrambling operations.

25. The computer-readable medium of claim 21, wherein the watermark to be inserted is visible and obtrusive.

26. The computer-readable medium of claim 21, wherein the scrambling algorithm is reversible.

27. The computer-readable medium of claim 21, wherein each of the second type of coefficient is coded by a code $(R_i, s(V_i))$ followed by $s(V_i)$ bits from the least significant positions of the 1's complement representation of $V_i$, wherein the scrambling algorithm includes instructions for performing at least operation (i), and wherein the magnitude bits of each of selected ones of the second type of coefficient which are to be XORed with a pseudo random number comprises the $s(V_i)$ bits of that coefficient.

28. The computer-readable medium of claim 21, wherein the scrambling algorithm includes instructions for performing at least operation (ii), and wherein the select number of pairs of blocks to which operation (ii) is to be applied are constrained to lie within a predetermined number of rows of digital data.

29. The computer-readable medium of claim 21, wherein the scrambling algorithm includes instructions for performing at least operation (iii), and wherein the differential values of the first type of coefficient are to be shuffled among blocks in the first sequence without changing the sum of the values of the first type of coefficient in the first sequence of blocks.

30. The computer-readable medium of claim 21, wherein the scrambling algorithm includes instructions for performing at least operation (iv), and wherein the select bits of the first type of coefficient that are to be shuffled among blocks in the second sequence are select left-most bits.

31. The computer-readable medium of claim 21, wherein, in the instructions for operation (iv), the shuffling of select bits of the first type of coefficient, but not of the second type of coefficient, among blocks in the second sequence comprises instructions for applying two pseudo-random permutations to the select bits.

* * * * *